United States Patent
Sahita et al.

(10) Patent No.: US 11,366,895 B2
(45) Date of Patent: Jun. 21, 2022

(54) MITIGATING SIDE-CHANNEL ATTACKS USING EXECUTABLE ONLY MEMORY (XOM)

(71) Applicant: Intel Corporation, Santa Clara, CA (US)

(72) Inventors: Ravi Sahita, Portland, OR (US); Mingwei Zhang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 16/145,635

(22) Filed: Sep. 28, 2018

(65) Prior Publication Data

US 2019/0042735 A1 Feb. 7, 2019

(51) Int. Cl.
*G06F 21/54* (2013.01)
*G06F 12/0877* (2016.01)
*G06F 21/56* (2013.01)
*G06F 9/455* (2018.01)

(52) U.S. Cl.
CPC .......... *G06F 21/54* (2013.01); *G06F 9/45558* (2013.01); *G06F 12/0877* (2013.01); *G06F 21/566* (2013.01); *G06F 2009/45583* (2013.01); *G06F 2009/45587* (2013.01); *G06F 2212/1052* (2013.01)

(58) Field of Classification Search
None
See application file for complete search history.

(56) References Cited

U.S. PATENT DOCUMENTS

| 5,940,850 | A | * | 8/1999 | Harish | G06F 12/0638 711/102 |
| 9,436,603 | B1 | * | 9/2016 | Pohlack | G06F 21/556 |
| 2006/0200863 | A1 | * | 9/2006 | Ray | G06F 12/145 726/24 |
| 2009/0037662 | A1 | * | 2/2009 | La Frese | G06F 12/0888 711/136 |

(Continued)

OTHER PUBLICATIONS

Koning et al. "No Need to Hide: Protecting Safe Regions on Commodity Hardware" Apr. 23, 2017, EuroSys '17: Proceedings of the Twelfth European Conference on Computer SystemsApr. 2017 pp. 437-452 (Year: 2017).*

(Continued)

*Primary Examiner* — Eleni A Shiferaw
*Assistant Examiner* — Bassam A Noaman
(74) *Attorney, Agent, or Firm* — Alliance IP, LLC

(57) ABSTRACT

Embodiments include side channel defender circuitry to protect shared code pages in executable only memory (XOM) from side-channel exploits. The side channel defender circuitry receives system calls and determines whether code pages include executable code, whether the code pages include writeable code, and whether the code pages include instructions capable of altering or modifying one or more protection keys associated with code pages stored in XOM. If the code pages contain executable code that is writeable or executable code that includes instructions capable of altering or modifying one or more protection keys associated with code pages stored in XOM the side channel defender circuitry, the side channel defender circuitry aborts the system call.

18 Claims, 5 Drawing Sheets

(56) References Cited

U.S. PATENT DOCUMENTS

| | | | | |
|---|---|---|---|---|
| 2011/0239291 | A1* | 9/2011 | Sotka | H04L 63/1408 726/14 |
| 2016/0110298 | A1* | 4/2016 | Koufaty | G06F 21/52 726/28 |
| 2016/0210069 | A1* | 7/2016 | Lutas | G06F 3/0664 |
| 2018/0060249 | A1* | 3/2018 | Tsirkin | G06F 9/445 |
| 2018/0081830 | A1* | 3/2018 | Kaplan | G06F 12/1009 |
| 2020/0034538 | A1* | 1/2020 | Woodward | G06F 21/566 |
| 2020/0042732 | A1* | 2/2020 | Nair | G06F 21/6218 |

OTHER PUBLICATIONS

Intel Corporation. Intel 64 and IA-32 Architectures Software Developer's Manual. vol. 3. Apr. 2016. (Year: 2016).*

Lipp, Moritz et al., Meltdown, 27th {USENIX} Security Symposium ({USENIX} Security 18), 2018, 16 pages.

Kocher, Paul, et al.. Spectre Attacks: Exploiting Speculative Execution, 40th IEEE Symposium on Security and Privacy (S&P'19)2018, 19 pages.

Chen et al., "NORAX: Enabling Execute-Only Memory for COTS Binaries on AArch64," IEEE Symposium on Security and Privacy, May 2017, San Jose, CA (16 pgs).

Execute-Only Memory, "ARM Compiler Software Development Guide;" V5.04 published Nov. 27, 2013, as accessed Jan. 15, 2021 from: https://developer.arm.com/documentation/dui0471/j/embedded-software-development/execute-only-memory (3 pgs.).

Intel Protection Keys, Section 4.6.2; Intel® 64 and IA-32 Architectures Software Developer's Manual, Oct. 2019, pp. 135-136 (2 pgs).

Zhang et al., "Cross-Tenant Side-Channel Attacks in PaaS Clouds;" CCS '14: Proceedings of the 2014 ACM SIGSAC Conference on Computer and Communications Security, Nov. 2014; pp. 990-1003(14 pgs).

Zhang et al., "XOM-Switch: Hiding your code from advanced code reuse attacks;" Black Hat Asia; Mar. 22, 2018, Singapore; as accessed Jan. 15, 2021 at https://www.blackhat.com/asia-18/briefings/schedule/#xom-switch-hiding-your-code-from-advanced-code-reuse-attacks-in-one-shot-9232 (2 pgs.).

Zhou et al., "A Software Approach to Defeating Side Channels in Last-Level Caches," CCS '16: Proceedings of the 2016 ACM SIGSAC Conference on Computer and Communications Security, Oct. 2016, pp. 871-882 (12 pgs.).

* cited by examiner

MITIGATING SIDE-CHANNEL ATTACKS USING EXECUTABLE ONLY MEMORY (XOM)

TECHNICAL FIELD

The present disclosure relates to computer security, specifically the mitigation of side-channel attacks.

BACKGROUND

Side-channel attacks gained widespread notoriety in early 2018. A side-channel attack includes any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Side-channel attacks include Spectre and Meltdown, both of which rely on deducing whether data originates in a cached or un-cached location. To a significant degree, the determination of where data originates relies upon the precise timing of events such as loads from memory space.

Executable only memory ("XOM") is intended to prevent flush and reload attacks that attempt to leverage shared code pages. For example, two processes "A" and "B" share one or more code pages. At least one of the shared code pages contains a control flow graph (CFG) that provides an indication when process "A" is accessing data stored or retained at memory address "ADDRESS1" reserved for use only by process "A." The processor circuitry copies the value of ADDRESS1 to processor cache circuitry. Attacker process "B" flushes then reads ADDRESS1, and using a timing side-channel determines whether Process A has accessed ADDRESS1. If Process "B" determines that the read time for ADDRESS1 is relatively short, then Process "A" has accessed ADDRESS1. However, if Process "B" determines that the read time for ADDRESS1 is anything other than relatively short, then Process "A" has not accessed ADDRESS1.

Modern operating systems map the kernel into the address space of every process executed by the processor. Access to the kernel space is restricted using a supervisor bit of the processor that is set to permit kernel access to the kernel space and is reset to block or prohibit user access to the kernel space. Meltdown overcomes this memory isolation, thereby permitting the user process to read the entire kernel memory of the machine executing the user process. Meltdown relies upon out-of-order execution to obtain data from the kernel space. CPUs supporting out-of-order execution support running operations speculatively to the extent that processor's out-of-order logic processes instructions before the CPU is certain whether the instruction is valid and committed. Meltdown reads information from the protected kernel space by causing the processor to execute multiple instructions such as:

data-getByte(kernelAddress)
 variable=probeArray(data)

The "getByte" instruction will ultimately fail because of the prohibited read of kernel memory. However, the simultaneous access of an element in "probeArray" will pull the data from "probeArray" into cache. By timing reads at addresses from 0 to 255 in cache, the attacker is able to deduce the content of "kernelAddress."

For example, after flushing the cache, the Meltdown attacker retrieves a value "01000000" (binary "64") from a first address in the kernel memory. Prior to the processor generating an exception to the unauthorized read from kernel memory, the attacker uses retrieved kernel data as an index to access element "64" in a known array located in user space. The processor retrieves the value of array element 64 and loads the value into cache. The attacker then attempts to read every element from the array—access times for elements 0-63 and 65-255 will be relatively long as the data is retrieved from main memory. However, the access time for element 64 will be considerably shorter as the data need only be retrieved from the cache. From this the attacker can deduce the data the first address in kernel memory is "0100000". By performing the action for every location in kernel memory, the attacker is able to read the contents of the kernel memory.

A first class of Spectre attacks takes advantage of branch target misprediction by a CPU to read data from memory into cache. Upon detecting the misprediction, the CPU clears the data from the pipeline, but the data read into cache remains. A covert side-channel may then be used to obtain the residual data from the cache. In this class of attack, the attacker trains the branch predictor in a system to take a particular branch. For example, using the following instructions, an attacker may train the system by providing values for "x" that are consistently smaller than the size of "array1." The attacker thus trains the system to speculatively execute the subsequent instruction based on the assumption that the branch has been historically true:

```
if ( x < array1.size( )) {
    int value = array2[array1[x] * 256] // branch 1
}
```

After training the system, the attacker sets the cache to a known state and provides a value of "x" that exceeds the size of "array1." Having been previously trained that "x" is typically less than the size of "array1," the processor executes the branch instruction (prior to the processor throwing the exception due to "x" being greater than the size of "array1") and uses the value found at address "x" as an index to look up the value at address "x" in array2. The processor loads the value at address "x" in array2 into cache. The attacker then reads all of the values of array2 and is able to determine the value of "x" as the address in array2 having the shortest access time.

For example, assume array1 has 256 elements addressed "0" to "255." The attacker provides values of "x" between 0 and 255 to train the system that the branch instruction is routinely executed. The attacker then sets the cache to a known state and provides a value of 512 for "x" (i.e., a value greater than 255). The value "01000000" (i.e., "64") at memory location 512 is read. The processor then looks up the value of array2 at address 64*256 and loads the value into cache. The attacker then examines the read time for each element in array2, the read time for element at address 64*256 will be less than the read time for the other array2 addresses, providing the attacker the information that the address at memory location 512 is "01000000" or "64." By performing the action for every memory location, the attacker is able to read the contents of the memory byte-by-byte.

A second class of Spectre attacks exploits indirect branching by poisoning the Branch Target Buffer (BTB) such that a CPU speculatively executes a gadget that causes the CPU to read data from memory into cache. Upon detecting the incorrect branching, the CPU clears the data from the pipeline but, once again, the data read into cache remains. A covert side-channel may then be used to obtain the residual data from the cache. In this class of attack, the attacker poisons the BTB of the victim system by repeatedly performing indirect branches to a virtual address in the victim's system that contains the gadget. For example, an attacker may control the content of two registers (R1, R2) in the victim's system at the time an indirect branch occurs. The attacker must find a gadget in the victim's system that, upon speculative execution by the victim's CPU, leaks data from selected memory locations in the victim's system. The gadget may be formed by two instructions, the first of which contains an instruction that mathematically and/or logically (add, subtract, XOR, etc.) combines the contents of register R1 with another register in the victim's system and stores the result in R2. The second instruction reads the contents of register R2, storing the value in R2 in cache.

For example, the attacker may control two registers in the victim system, ebx (R1) and edi (R2). The attacker then finds two instructions on the victim's system, such as:

adc edi,dword ptr [ebx+edx-13BE13BDh]
ado dl,byte prt [edi]

By selecting ebx=m 0x13BE13BD—edx the attacker is able to read the victim's memory at address "m." The result is then added to the value in edi (R2). The second instruction in the gadget causes a read of R2 which contains the sum of "m" plus the attacker's value initially loaded into edi, transferring the value into the cache. By detecting the location of R2 within the cache using a side-channel timing attack, the attacker is able to determine the value of "m."

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
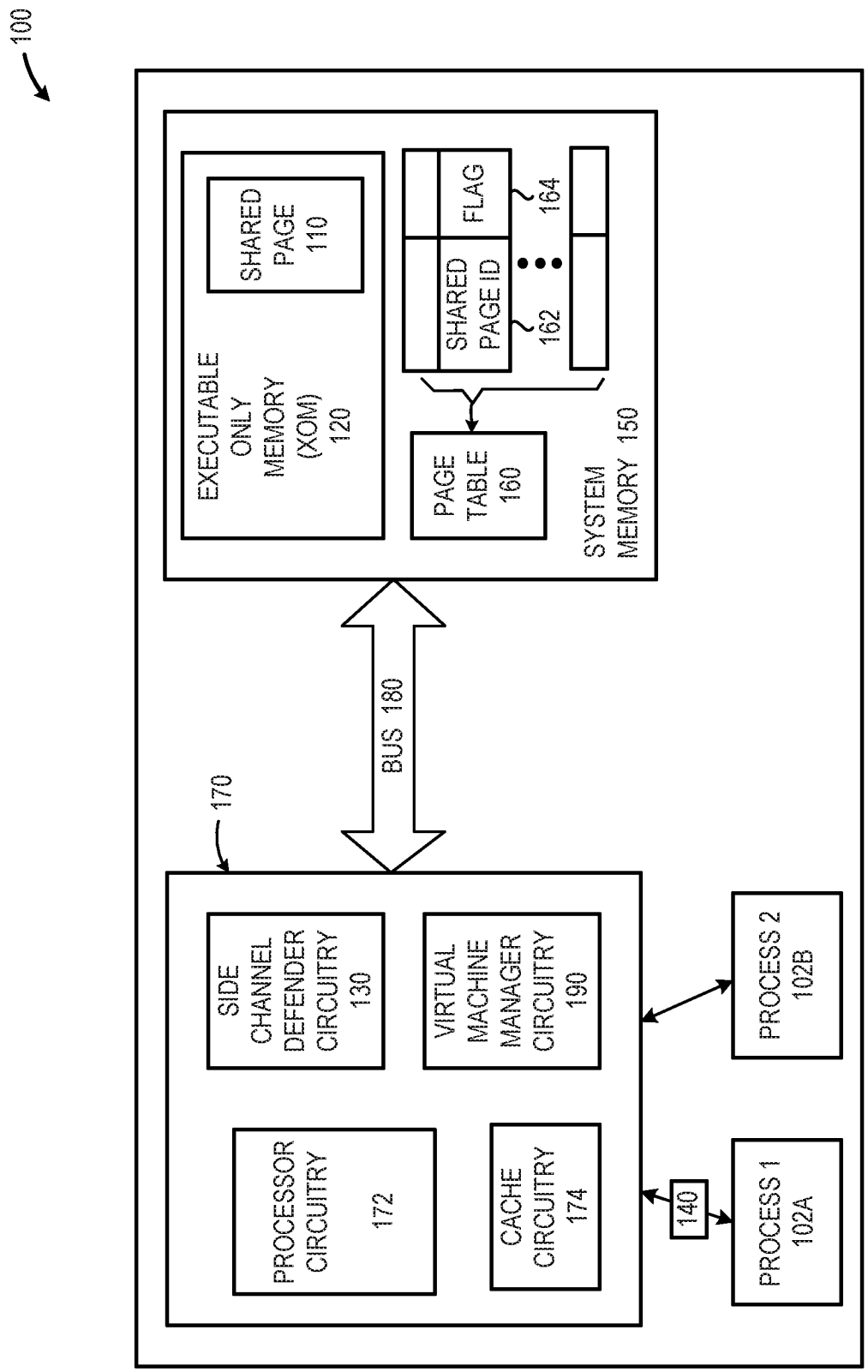
FIG. 1 is a schematic diagram of an illustrative system in which multiple processes share a page in executable only memory ("XOM") and in which side channel defender circuitry determines whether a system call that includes a memory allocation request received from a first process is capable of causing an operation that exposes information associated with the second process via one or more side-channels, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Shared resources across running entities from different trust domains open a potential avenue for side-channel attacks. For example, cloud service providers frequently employ memory deduplication to reduce memory footprint—this deduplication allows sharing of executable code pages across multiple, different, tenants. Similarly, in a guest operating system, code pages are often shared by default across processes in different trust levels provided the processes load the same executable module. This situation permits an attacker to use cache side-channels to probe the program execution state of trusted entities. For instance, the use of the CLFLUSH instruction permits an attacker to flush the contents of the cache to a specific range of physical addresses in memory. The CLFLUSH instruction would take effect across each core having the specific memory in cache would be flushed to physical memory. If a trusted program is executing the code, a timing-based side channel attack becomes observable to an attacker. The systems and methods disclosed herein prevent such side-channel attacks by enforcing limitations on eXecutable Only Memory (XOM) at both an operating system and virtual machine manager level to prevent code sharing based side channels dependent upon the attacking scenario.

The systems and methods described herein prevent the execution of code from shared pages that would cause a cache line flush of data from the processor cache to a defined location in system memory. The systems and methods described herein advantageously prevent the successful execution of a cache line flush operation while beneficially retaining code sharing capabilities. At a user level, the systems and methods described herein determine whether a memory allocation related system call includes writable code or any code, such as a WRPKRU instruction, capable of altering the protection key associated with a shared memory page. If the memory allocation related system call is writable or includes instructions capable of altering the protection key associated with a shared memory page, the system call is permitted to fail. Otherwise the memory allocation related system call is permitted to complete in XOM. At a virtual machine (VM) level, duplicate code pages are 0 and shared between two or more VMs. To mitigate alteration of the code on the shared code page, the extended page table (EPT) permission bit associated with the newly created shared page is set to "executable only."

A side-channel attack protection system is provided. The system may include: control circuitry; memory circuitry coupled to the control circuitry; a storage device that includes instructions, when executed by the control circuitry, cause the control circuitry to: selectively render an unsuccessful a cache line flush (CLFLUSH) instruction on one or more shared memory pages.

A side-channel attack protection method is provided. The method may include: determining, by control circuitry, whether a memory page access request attempts to access one or more shared memory pages; and responsive to a determination that the memory page access request accesses a shared memory page, selectively render unsuccessful a cache line flush (CLFLUSH) instruction on at least one of the one or more shared memory pages.

A non-transitory machine-readable storage medium is provided. The non-transitory machine-readable storage medium includes instructions that, when executed by the control circuitry, may cause the control circuitry to: selectively render unsuccessful a cache line flush (CLFLUSH) instruction on one or more shared memory pages.

A side-channel attack protection system is provided. The system may include: means for determining whether a memory page access request attempts to access one or more shared memory pages; and means for responsive to a determination that the memory page access request accesses a shared memory page, selectively render unsuccessful a cache line flush (CLFLUSH) instruction on at least one of the one or more shared memory pages.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 is a schematic diagram of an illustrative system 100 in which multiple processes 102A, 102B (collectively, "processes 102") share a page 110 in executable only memory ("XOM") 120 and in which side channel defender circuitry 130 determines whether a system call 140 that includes a memory allocation request received from a first process 102A is capable of causing an operation that exposes information associated with the second process 102B via one or more side-channels, in accordance with at least one embodiment described herein. As depicted in FIG. 1, the XOM 120 may be disposed at least partially in system memory 150. In embodiments, a page table 160 may include information such as a data representative of a page identifier 162 and one or more flags 164 associated with the shared page 110. As depicted in FIG. 1, in embodiments, the side channel defender circuitry 130 may be disposed in whole or in part within a multi-chip module or central processing unit ("CPU") 170. The CPU 170 also includes processor circuitry 172 and processor cache circuitry 174. A bus 180 communicably couples system memory 150 to the CPU 170.

In one embodiment, two processes 102, for example two processes each having at least one thread running on a multicore CPU 170, may share a code page 110 that is retained, stored, or otherwise disposed in a portion of system memory 150 designated as executable only memory 120. A page table 160 may include one or more flags 164, such as a protection key, that limits the ability of users to read data from the shared code page 110. The one or more flags 164 may, for example, designate the shared code page 110 as an "executable only" shared code page 110. The first process 102A may generate a system call 140 that includes a memory allocation request. In response to receipt of the system call 140 from the first process 102A, the side channel defender circuitry 130 may execute one or more instruction sets that cause the side channel defender circuitry 130 to determine whether the received system call 140 includes executable code. If the system call 140 does not include executable code, the side channel defender circuitry permits the system call 140 to proceed. If the system call 140 includes executable code then the side channel defender circuitry 130 determines whether the system call 140 includes writeable code. If the system call 140 includes writeable code, the side channel defender circuitry aborts the system call 140. If the system call 140 does not include writeable code then the side channel defender circuitry 130 determines whether the system call 140 includes any instructions, such as a WRPKRU instruction, capable of altering the one or more flags 164 (e.g., one or more permission keys) associated with a shared memory page 110. If the system call 140 includes instructions capable of altering the one or more flags 164 associated with a shared memory page 110, the side channel defender circuitry 130 aborts the system call 140. If the system call 140 does not include instructions capable of altering the one or more flags 164 associated with a shared memory page 110, the side channel defender circuitry 130 permits the system call 140 to proceed.

In embodiments, the side channel defender circuitry 130 may determine whether the system call 140 originated as an anonymous request. If the system call 140 originated as an anonymous request, the side channel defender circuitry 130 associates a "non-accessible" flag 164 with the requested page. By flagging the requested page as "non-accessible" if the code page is shared across processes, the code page would be executable only and CLFLUSH targeting of the page would not be succeed.

In one or more other embodiments, the processes 102 may include a first virtual machine and a second virtual machine (collectively, "VMs"). In such embodiments, a virtual machine manager ("VMM") 190 may scan each of the pages associated with the VMs to detect duplicate pages. The VMM 190 may autonomously consolidate memory usage by reducing the duplicate pages to a single shared page 110 (i.e., the VMM 190 consolidates memory usage by de-duplicating the duplicate pages). After de-duplication, the VMM 190 marks the single shared page 110 as "executable only," thereby preventing writes to and reads from the single shared page 110.

The system memory 150 includes any number and/or combination of any currently available and/or future developed electrical components, semiconductor devices, optical storage components, quantum storage components, molecular storage components, and/or logic elements capable of volatile and/or persistent storage of digital data. In various embodiments, system memory 150 be based on any of wide variety of information storage technologies, possibly including volatile technologies requiring the uninterrupted provision of electric power, and possibly including technologies entailing the use of machine-readable storage media that may be removable, or that may not be removable. Thus, the system memory 150 may comprise any of a wide variety of types of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONGS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array).

It should be noted that although each of the storages are depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM).

At least a portion of the system memory 150 may be designated execute only memory (XOM) 120. The XOM 120 may be used to store shared pages 110 containing executable code. The executable code contained in the shared page 110 may be accessed by multiple processes 102, such as multiple virtual machines. In embodiments, data transfers to the XOM 120 are blocked and return data may be read as a null value or "0." In embodiments, some or all of the code pages, such as the shared code page 110, stored or otherwise retained in the XOM 120 may be logically associated with a memory protection flag 164 (e.g., a Protection Key such as implemented on Intel® microprocessors). In embodiments, a page table 160 stored or otherwise trained in the system memory 150 may include information representative of a logical association between the shared page and the memory protection flag 164. For example, the page table 160 may include a shared page identifier 162 that uniquely identifies the shared memory page 110. The page table 160 may also include data representative of a memory protection flag 164 logically associated with the respective shared memory page 110. The memory protection flag 164 associated with the shared page 110 may identify the shared page 110 as readable, writeable, executable, or non-accessible.

While XOM 120 provides a degree of protection against remote side-channel attacks, since local attackers are able to exploit shared code pages to execute binaries and perform system calls, XOM 120 alone is inadequate for protection against local attackers. For example, if a local attacker is able to surreptitiously insert code that includes a "write protection key rights user"—a "WRPKRU" command into a shared code page, upon execution of the WRPKRU the attacker could change the memory protection flag 164 associated with the shared code page 110 from "execute only" or "non-accessible" to "read" or "write." By changing the memory protection flag 164, the attacker is able to glean information on other processes 102 via a side channel, such as a timing side channel. The systems and methods disclosed herein beneficially close this exploit by preventing the alteration of shared code pages 110 that are stored or otherwise retained in XOM 120.

The processor unit 170 includes processor circuitry 172 and cache circuitry 174. In embodiments, all or a portion of the side channel defender circuitry 130 may be disposed in the processor unit 170. In embodiments, memory management circuitry disposed in the processor unit 170 may provide all or a portion of the VMM circuitry 190. The processor unit 170 may include any number and/or combination of currently available and/or future developed electrical components, semiconductor devices, and/or logic elements capable of executing one or more machine-readable instruction sets and communicating with one or more external input and/or output devices via one or more communicably coupled 110 interfaces. In various embodiments, the processor unit 170 may include any of a wide variety of commercially available processors, including without limitation, an AMD® Athlon®, Duron® or Opteron® processor; an ARM® application, embedded and secure processors; an IBM® and/or Motorola® DragonBall® or PowerPC® processor; an IBM and/or Sony® Cell processor; or an Intel® Celeron®, Core (2) Duo®, Core (2) Quad®. Core i3®, Core i5®, Core i7®, Atom®, Itanium®, Pentium®, Xeon®, Xeon Phi®' or XScale® processor. Further, processing unit 170 may include a multi-core processor (whether the multiple cores coexist on the same or separate dies), and/or a multi-processor architecture of some other variety by which multiple physically separate processors are in some way linked. The processing unit 170 may include but is not limited to: a system-on-chip (SoC), a field programmable gate array (FPGA), a multi-chip module (MCM), an application specific integrated circuit (ASIC), or similar.

The side channel defender circuitry 130 may include any number and/or combination of currently available and/or future developed electrical components, semiconductor devices, and/or logic elements capable of executing instruction sets that cause the side channel defender circuitry 130 to detect the presence of one or more threats caused by the presence of executable code included in a system call originated by a process 102. In embodiments, the instructions executed by the side channel defender circuitry 130 may detect whether a memory allocation request includes a page having executable code, whether the code included on the page is writeable, and/or whether the code includes one or more instructions capable of altering or changing a memory protection flag 164 associated with a shared page 110 retained, stored, or otherwise disposed in XOM 120.

The VMM circuitry 190 may include any number and/or combination of currently available and/or future developed electrical components, semiconductor devices, and/or logic elements capable of executing instruction sets that cause the VMM circuitry 190 to detect the presence of duplicate code pages across a plurality of VMs and reduce the duplicate code pages to a single shared code page 110 that is shared by the respective VMs. Additionally, the VMM 190 may causer or otherwise form a logical association between the single shared code page 110 and a memory protection key 164 that designates the shared code page as an "executable only" page in XOM 120.

Figure 2:
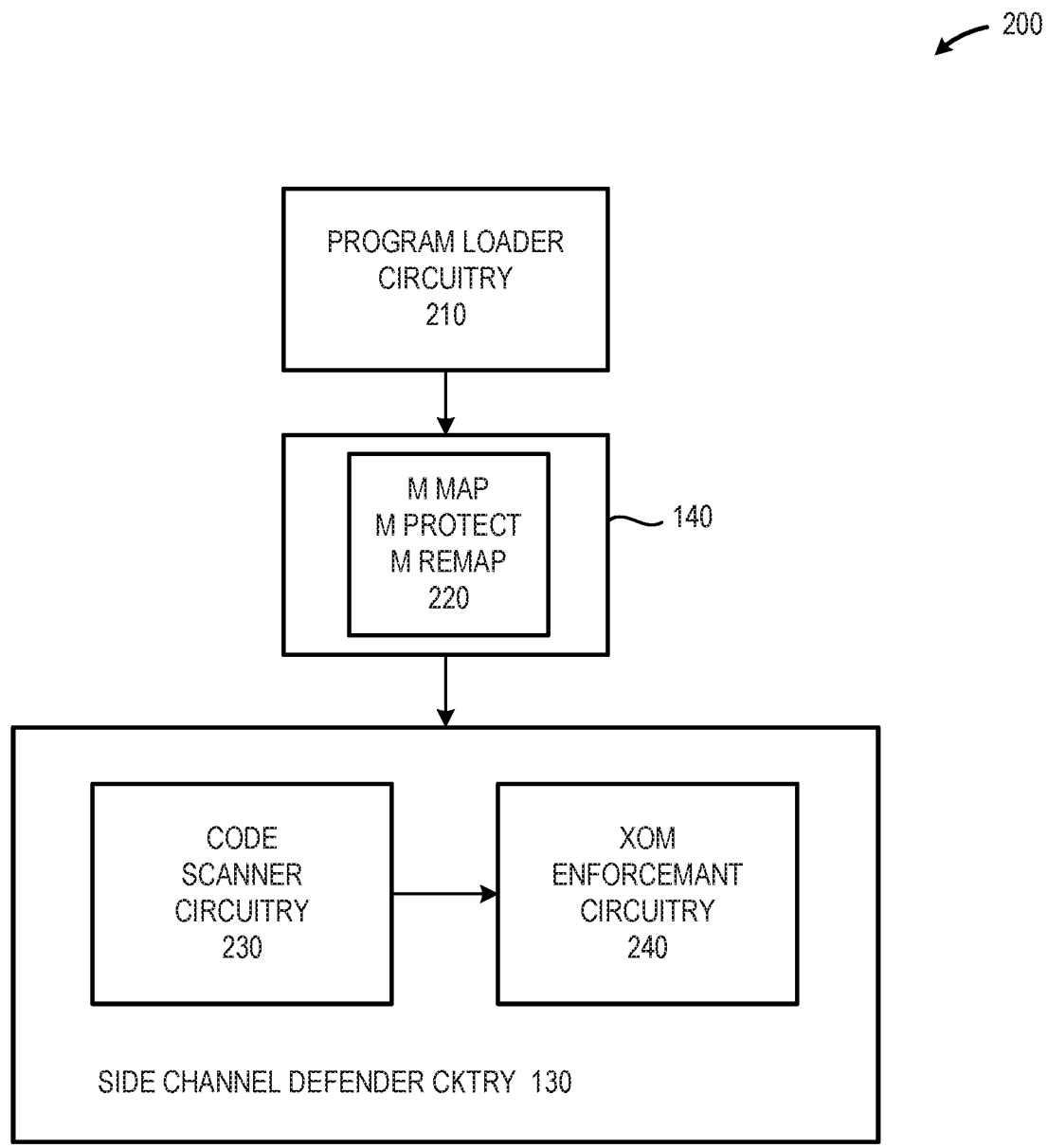
FIG. 2 is a block diagram of an illustrative side channel defender circuitry system in which side channel defender circuitry that includes code scanner circuitry and XOM enforcement circuitry receives a system call from program loader circuitry, in accordance with at least one embodiment described herein.

FIG. 2 is a block diagram of an illustrative side channel defender circuitry system 200 in which side channel defender circuitry 130 that includes code scanner circuitry 230 and XOM enforcement circuitry 240 receives a system call 220 from program loader circuitry 210, in accordance with at least one embodiment described herein. In embodiments, the system call 220 may include but is not limited to: "MMAP" (an instruction to map files or a device to memory); "MPROTECT" (an instruction to change memory access protections); or "MREMAP" (an instruction that changes the size of memory mapping).

Upon receipt of the system call 140, the code scanner circuitry 230 performs a number of evaluations. The code scanner circuitry 230 first determines whether a code page 220 associated with the system call 140 includes executable code. If no executable code is detected, the side channel defender circuitry 130 permits the system call 140 to complete. On the other hand, if executable code is present in the code page 220, the side channel defender circuitry 130 then determines whether the code page 220 is writeable. If the code page 220 includes writeable code, then the side channel defender circuitry 130 causes the system call 140 to fail to protect against future malicious code modification that would permit access to side-channel information. If writeable code is present in the code page 220, the side channel defender circuitry 130 causes the system call to fail. If writeable code is not present in the code page 220, the side channel defender circuitry 130 then determines whether the code page 220 includes one or more instructions (e.g., a write protection key rights user or "WRPKRU" instruction)

capable of altering or modifying a memory protection flag 164 associated with one or more shared code pages 110 included in the XOM 120. If instructions capable of altering or modifying a memory protection flag 164 are included in the code page 220, the side channel defender circuitry 130 causes the system call 140 to fail.

Additionally, in some embodiments, the side channel defender circuitry 130 may determine whether an anonymous source generated the system call 140. If an anonymous source generated the system call 140, the side channel defender circuitry 130 sets the memory protection flag 164 associated with the code page 220 to protect the code page 220 as "executable only."

The code scanner circuitry 230 may include any number and/or combination of currently available and/or future developed electrical components, semiconductor devices, and/or logic elements capable of executing instruction sets that cause the code scanner circuitry 230 to detect the presence of executable code, writeable code, and/or code capable of affecting memory protection flags 164 associated with one or more shared pages 110 in XOM 120. In embodiments, the side channel defender circuitry 130 provides all or a portion of the code scanner circuitry 230.

Upon determining the system call 140 should be permitted to proceed, the code scanner circuitry 230 passes the system call 140 to the XOM enforcement circuitry 240. In embodiments, the XOM enforcement circuitry 240 enforces the memory protection flag 164 for each of the memory pages included in XOM 120. The XOM enforcement circuitry 240 may include any number and/or combination of currently available and/or future developed electrical components, semiconductor devices, and/or logic elements capable of executing instruction sets that cause the XOM enforcement circuitry 240 to enforce (read only, executable only, etc.) the memory protection flag 164 associated with each shared memory page 110 stored or otherwise retained in XOM 120. In embodiments, the side channel defender circuitry 130 provides all or a portion of the XOM enforcement circuitry 240.

Figure 3:
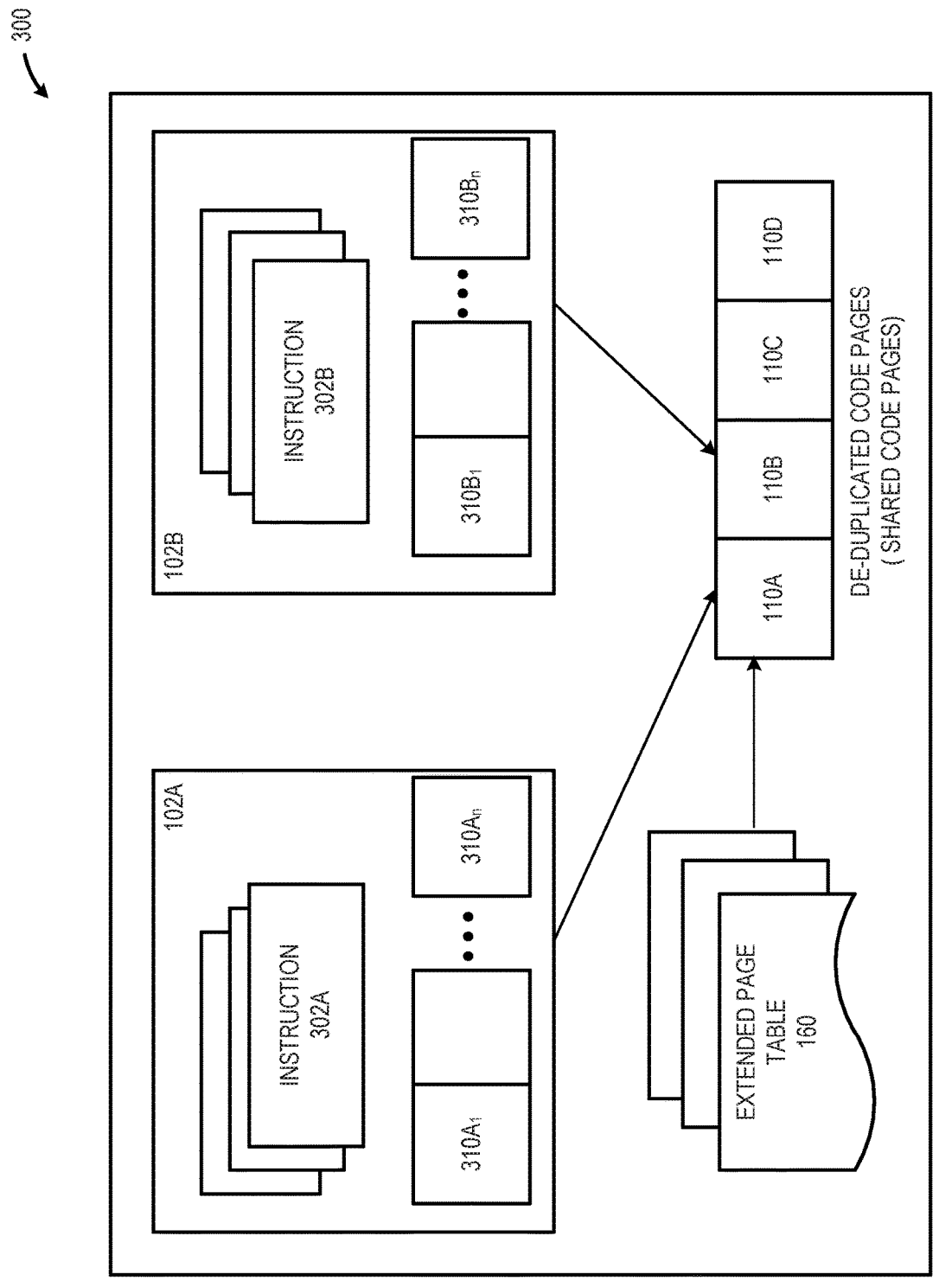
FIG. 3 is a schematic diagram of an illustrative system in which VMM circuitry consolidates memory pages duplicated across multiple virtual machines to a single shared code page that is designated "executable" in the extended page table, in accordance with at least one embodiment described herein.

FIG. 3 is a schematic diagram of an illustrative system 300 in which VMM circuitry 190 consolidates memory pages 310 duplicated across multiple virtual machines to a single shared code page 110 that is designated "executable" in the extended page table 160, in accordance with at least one embodiment described herein. As depicted in FIG. 3, a plurality of pages 310A$_1$-310A$_n$, 310B$_1$-310B$_n$, (collectively, "pages 310") may be associated with processes 102A and 102B, respectively. In embodiments, the instructions 302A, 302B executed by each of the processes 102A, 102B may generate pages 310 that include executable code and at least some of the pages 310 may be duplicated between the two processes 102. The VMM 190 detects duplicate code pages 310 across all processes 102, de-duplicates the pages, and provides a single shared memory page 110 designated as executable only in the extended page table 160.

Figure 4:
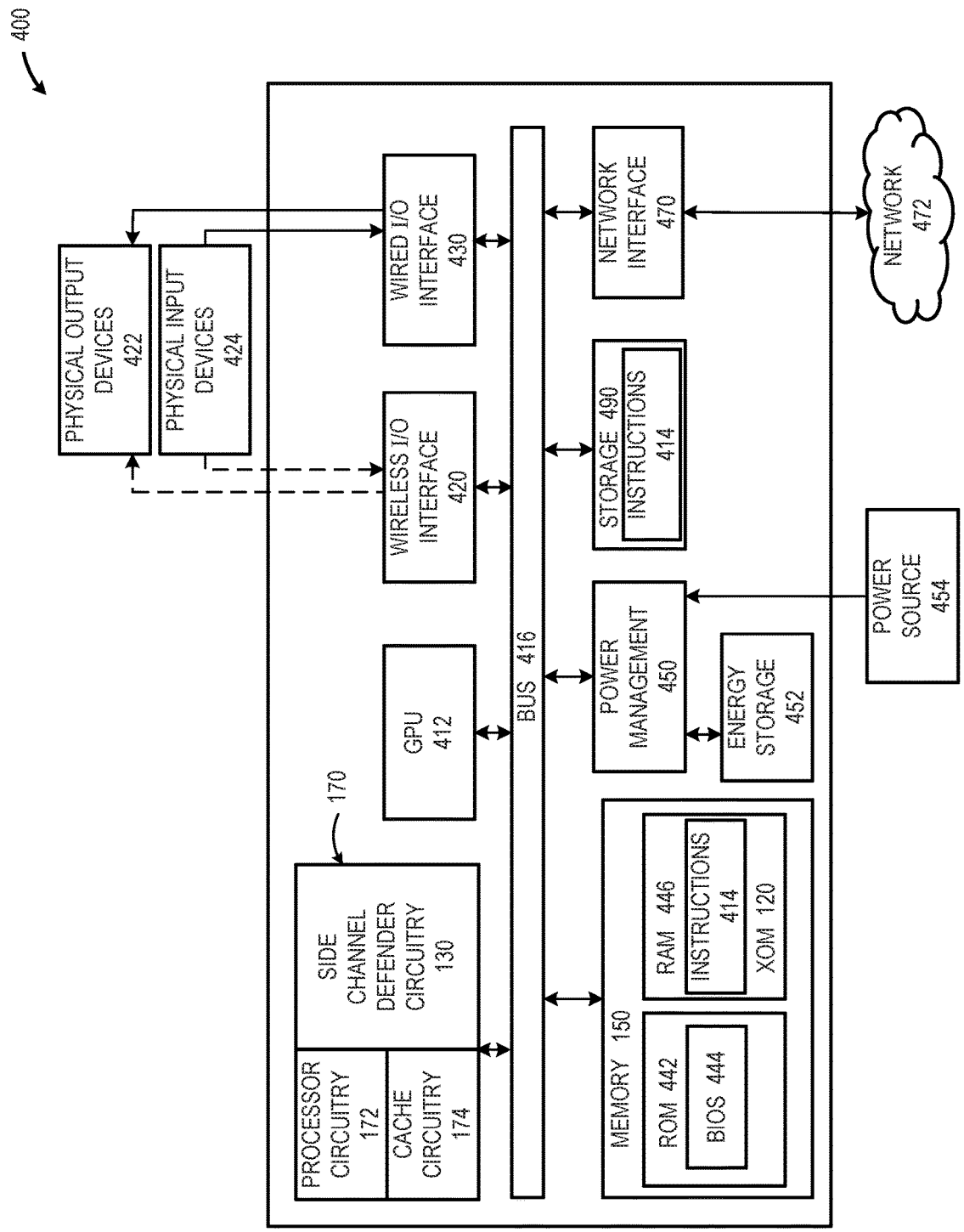
FIG. 4 is a schematic diagram of an illustrative electronic, processor-based, device that includes a CPU having processor circuitry, cache circuitry, and side channel defender circuitry that protects shared code pages in XOM, in accordance with at least one embodiment described herein.

FIG. 4 is a schematic diagram of an illustrative electronic, processor-based, device 400 that includes a CPU 170 having processor circuitry 172, cache circuitry 174, and side channel defender circuitry 130 that protects shared code pages 110 in XOM 120, in accordance with at least one embodiment described herein. The processor-based device 400 may additionally include one or more of the following: a graphical processing unit 412, a wireless input/output (I/O) interface 420, a wired I/O interface 430, system memory 150, power management circuitry 450, a non-transitory storage device 490, and a network interface 470. The following discussion provides a brief, general description of the components forming the illustrative processor-based device 400. Example, non-limiting processor-based devices 400 may include, but are not limited to: smartphones, wearable computers, portable computing devices, handheld computing devices, desktop computing devices, blade server devices, workstations, and similar.

The processor-based device 400 includes processor circuitry 172, cache circuitry 174, and side channel defender circuitry 130. In operation, the side channel defender circuitry 130 may examine system calls 140. In specific embodiments, the side channel defender circuitry 130 may examine system calls 140 for memory allocation requests that include code pages. Upon detecting a code page 220 that includes executable code, the side channel defender circuitry 130 determines whether the code page 220 includes writeable code. If writeable code is present, the side channel defender circuitry 130 aborts the system call 140. If no writeable code is present in the code page 220, the side channel defender circuitry 130 determines whether the code page 220 includes instructions and/or commands capable of altering or modifying the memory protection key 164 associated with one or more shared code pages 110. If the code page 220 includes instructions and/or commands capable of altering or modifying the memory protection key 164 associated with one or more shared code pages 110, the side channel defender circuitry 130 aborts the system call 140.

In some embodiments, the processor-based device 400 includes graphics processor circuitry 412 capable of executing machine-readable instruction sets 414 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 172 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 400 includes a bus or similar communications link 416 that communicably couples and facilitates the exchange of information and/or data between various system components including the processor circuitry 172, the graphics processor circuitry 412, one or more wireless I/O interfaces 420, one or more wired I/O interfaces 430, the system memory 150, one or more storage devices 490, and/or one or more network interfaces 470. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 172 may include any number, type, or combination of currently available or future developed devices capable of executing machine-readable instruction sets. The processor circuitry 172 may include but is not limited to any current or future developed single- or multi-core processor or microprocessor, such as: on or more systems on a chip (SOCs); central processing units (CPUs);

digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 150 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 172 to load and/or execute one or more machine-readable instruction sets 414. In embodiments, at least some of the one or more machine-readable instruction sets 414 cause at least a portion of the processor circuitry 172 to provide, create, produce, transition, and/or function as a dedicated, specific, and particular machine, for example a word processing machine, a digital image acquisition machine, a media playing machine, a gaming system, a communications device, a smartphone, or similar.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include, but are not limited to: universal serial bus (USB), IEEE 1394 ("FireWire"), and similar.

The processor-based device 400 may include one or more communicably coupled, non-transitory, data storage devices 490. The data storage devices 490 may include one or more hard disk drives (HDDs) and/or one or more solid-state storage devices (SSDs). The one or more data storage devices 490 may include any current or future developed storage appliances, network storage devices, and/or systems. Non-limiting examples of such data storage devices 490 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof.

In some implementations, the one or more data storage devices 490 may include one or more removable storage devices, such as one or more flash drives, flash memories, flash storage units, or similar appliances or devices capable of communicable coupling to and decoupling from the processor-based device 400.

The one or more data storage devices 490 may include interfaces or controllers (not shown) communicatively coupling the respective storage device or system to the bus 416. The one or more data storage devices 490 may store, retain, or otherwise contain machine-readable instruction sets, data structures, program modules, data stores, databases, logical structures, and/or other data useful to the processor circuitry 172 and/or graphics processor circuitry 412 and/or one or more applications executed on or by the processor circuitry 172 and/or graphics processor circuitry 412. In some instances, one or more data storage devices 490 may be communicably coupled to the processor circuitry 172, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

Machine-readable instruction sets 414 and other programs, applications, logic sets, and/or modules may be stored in whole or in part in the system memory 150. Such instruction sets 414 may be transferred, in whole or in part, from the one or more data storage devices 490. The instruction sets 414 may be loaded, stored, or otherwise retained in system memory 150, in whole or in part, during execution by the processor circuitry 172 and/or graphics processor circuitry 412.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 172, the graphics processor circuitry 412, the wireless I/O interface 420, the wired I/O interface 430, the system memory 150, the power management circuitry 450, the storage device 150, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 172 and/or the graphics processor circuitry 412. In some embodiments, all or a portion of the bus 416 may be omitted and the components are coupled directly to each other using suitable wired or wireless connections.

Figure 5:
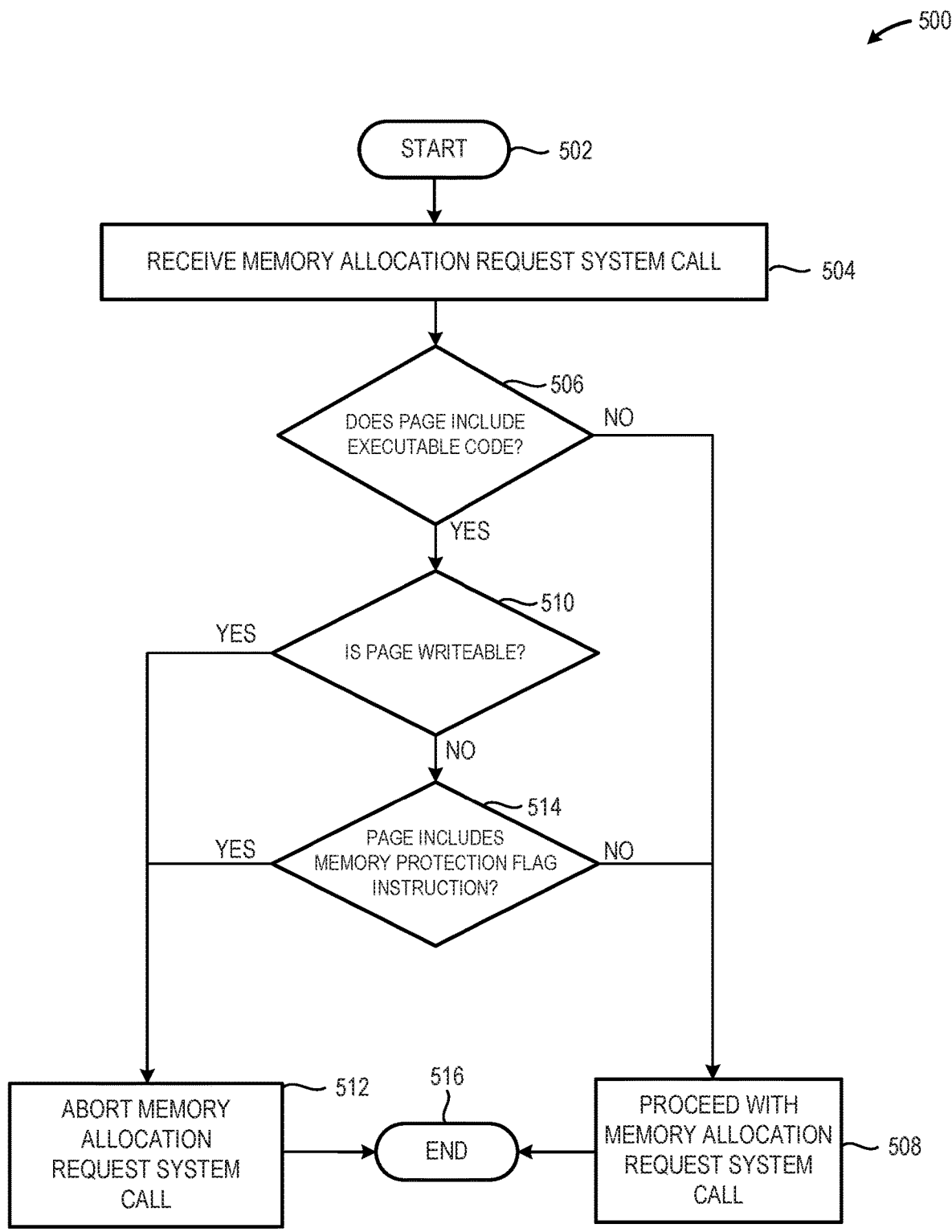
FIG. 5 is a high-level flow diagram of an illustrative method of mitigating side-channel attacks using executable only memory (XOM), in accordance with at least one embodiment described herein.

FIG. 5 is a high-level flow diagram of an illustrative method 500 of mitigating side-channel attacks using executable only memory (XOM) 120, in accordance with at least one embodiment described herein. The side channel defender circuitry 130 examines each system call 140 for the presence of a code page 220. Based on the content of the code page 220, the side channel defender circuitry 130 selectively permits the system call 220 to proceed or causes the system call 220 to abort. The method 500 commences at 502.

At 504, the side channel defender circuitry 130 receives a system call 140. In embodiments, the system call 140 may include a memory allocation request. In some embodiments, the memory allocation request may include one or more code pages 220. In embodiments, the one or more code pages 220 may include one or more commands or instructions.

At 506, the side channel defender circuitry 130 determines whether the system call 140 includes a code page 220 containing executable code. In embodiments, code scanner circuitry 230 may scan the received code page 220 to determine whether the system call 140 includes a code page 220 having executable code. If the code page 220 does not include executable code, the method 500 continues at 508. If the code page 220 does include executable code, the method 500 continues at 510.

At 508, responsive to a determination that the system call 140 does not contain a code page 220 having executable code, the side channel defender circuitry 130 permits the system call 140 to proceed. The method 500 then concludes at 516.

At 510, the side channel defender circuitry 130 determines whether the system call 140 includes a writeable code page 220. In embodiments, code scanner circuitry 230 may scan the received code page 220 to determine whether the system call 140 includes a writeable code page 220. If the system call 140 includes a writeable code page 220, the method 500 continues at 512. If the system call 140 does not include a writeable code page 220, the method 500 continues at 514.

At 512, responsive to a determination that the system call 140 contains a writeable code page 220, the side channel defender circuitry 130 causes the system call 140 to abort. The method 500 then concludes at 516.

At 514, the side channel defender circuitry 130 determines whether the system call 140 includes a code page having instructions or commands capable of altering or modifying a memory protection flag 164. In embodiments, code scanner circuitry 230 may scan the received code page 220 to determine whether the system call 140 includes a code page having instructions or commands capable of altering or modifying a memory protection flag 164. If the system call 140 includes instructions or commands capable of altering or modifying a memory protection flag 164, the method 500 continues at 512 and concludes at 516. If the system call 140 does not include instructions or commands capable of altering or modifying a memory protection flag 164, the method 500 continues at 508 and concludes at 516.

While FIG. 5 illustrates various operations according to one or more embodiments, it is to be understood that not all of the operations depicted in FIG. 5 are necessary for other embodiments. Indeed, it is fully contemplated herein that in other embodiments of the present disclosure, the operations depicted in FIG. 5 and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods that include side channel defender circuitry to protect shared code pages in executable only memory (XOM) from side-channel exploits. The side channel defender circuitry receives system calls and determines whether code pages include executable code, whether the code pages include writeable code, and whether the code pages include instructions capable of altering or modifying one or more protection keys associated with code pages stored in XOM. If the code pages contain executable code that is writeable or executable code that includes instructions capable of altering or modifying one or more protection keys associated with code pages stored in XOM the side channel defender circuitry, the side channel defender circuitry aborts the system call.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for mitigating side-channel attacks using executable only memory (XOM).

According to example 1, there is provided a side-channel attack protection system. The system may include: control circuitry; memory circuitry coupled to the control circuitry; a storage device that includes instructions, when executed by the control circuitry, cause the control circuitry to: selectively cause an unsuccessful cache line flush (CLFLUSH) instruction on one or more shared memory pages.

Example 2 may include elements of example 1 where the memory circuitry includes memory pages associated with two or more virtual machines; where the instructions cause all or a portion of the control circuitry to provide virtual machine manager (VMM) circuitry to: detect duplicate memory pages associated with the two or more virtual machines; provide a single shared memory page shared by the two or more virtual machines, the single shared memory page including the content of the detected duplicate memory pages; and associate an executable only identifier with the single shared memory page to selectively disable the READ permission of the single shared memory page.

Example 3 may include elements of any of examples 1 or 2 where the instructions that cause the control circuitry to selectively render unsuccessful a cache line flush (CLFLUSH) instruction based on code included in the shared memory page may further cause the control circuitry to: determine whether a memory allocation related system call request received from user space includes one or more executable code pages; responsive to a determination that the received memory allocation related system call request includes one or more executable code pages, determine whether any of the one or more executable code pages are writable; and responsive to a determination that the received memory allocation related system call request includes one or more writable executable code pages, cause the memory allocation related system call request to abort.

Example 4 may include elements of any of examples 1 through 3 where the instructions that cause the control circuitry to selectively render unsuccessful a cache line flush (CLFLUSH) instruction based on code included in the shared memory page may further cause the control circuitry to: determine whether any of the one or more executable code pages include instructions capable of changing a protection key associated with a shared page; and responsive to a determination that one or more executable code pages include instructions capable of changing a protection key associated with a shared page, cause the memory allocation related system call request to abort.

Example 5 may include elements of any of examples 1 through 4 where the instructions that cause the control circuitry to selectively render unsuccessful a cache line flush (CLFLUSH) instruction based on code included in the shared memory page may further cause the control circuitry to: determine whether the memory allocation related system call request maps a page from a storage device to memory; responsive to a determination that the memory allocation related system call request maps a page from a storage device to memory, cause the memory allocation related system call request to proceed.

Example 6 may include elements of any of examples 1 through 5 where the instructions that cause the control circuitry to selectively render unsuccessful a cache line flush (CLFLUSH) instruction based on code included in the shared memory page may further cause the control circuitry to: determine whether the memory allocation related system call request includes only a memory page allocation request; and responsive to a determination that the memory allocation related system call request includes only a memory page allocation request, cause the memory allocation related system call request to abort.

Example 7 may include elements of any of examples 1 through 6 where the instructions that cause the control circuitry to selectively render unsuccessful a cache line flush (CLFLUSH) instruction based on code included in the shared memory page may further cause the control circuitry to: responsive to a determination that one or more executable code pages does not include instructions capable of changing a protection key associated with a shared page, cause the memory allocation related system call request to proceed.

Example 8 may include elements of any of examples 1 through 7 where the instructions that cause the control circuitry to selectively render unsuccessful a cache line flush (CLFLUSH) instruction based on code included in the shared memory page present in the system memory may further cause the control circuitry to: responsive to a determination that the received memory allocation related system call request does not include one or more executable code pages, cause the memory allocation related system call request to proceed.

Example 9 may include elements of any of examples 1 through 8 where the instructions that cause the control circuitry to selectively render unsuccessful a cache line flush (CLFLUSH) instruction based on code included in the shared memory page may further cause the control circuitry to: responsive to a determination that the received memory allocation related system call request does not include one or more writable executable code pages, cause the memory allocation related system call request to proceed.

Example 10 may include elements of any of examples 1 through 9 where the instructions that cause the control circuitry to determine whether any of the one or more executable code pages include instructions capable of changing the protection key associated with the shared page may further cause the control circuitry to: determine whether any of the one or more executable code pages include a WRPKRU instruction capable of changing the protection key associated with the shared page.

According to example 11, there is provided a side-channel attack protection method. The method may include: determining, by control circuitry, whether a memory page access request attempts to access one or more shared memory pages; and responsive to a determination that the memory page access request accesses a shared memory page, selectively render unsuccessful a cache line flush (CLFLUSH) instruction on at least one of the one or more shared memory pages.

Example 12 may include elements of example 11 and the method may additionally include: detecting, by virtual machine manager (VMM) circuitry, duplicate memory pages associated with the two or more virtual machines; wherein determining, by control circuitry, whether a memory page access request attempts to access one or more shared memory pages comprises: determining, by control circuitry, whether a memory page access request attempts to access one or more shared memory pages associated with two or more virtual machines; providing, by the VMM circuitry, a single shared memory page shared by the two or more virtual machines, the single shared memory page including the content of the detected duplicate memory pages; and associating, by the VMM circuitry, an executable only identifier with the single shared memory page to selectively disable the READ permission of the single shared memory page.

Example 13 may include elements of any of examples 11 or 12 where selectively rendering unsuccessful the cache line flush (CLFLUSH) instruction on at least one of the one or more shared memory pages may further include: determining, by the control circuitry, whether a memory allocation related system call request received from user space includes one or more executable code pages; determining, by the control circuitry, whether any of the one or more executable code pages are writable responsive to a determination that the received memory allocation related system call request includes one or more executable code pages; and causing, by the control circuitry, the memory allocation related system call request to abort responsive to a determination that the received memory allocation related system call request includes one or more writable executable code pages.

Example 14 may include elements of any of examples 11 through 13 where selectively rendering unsuccessful the cache line flush (CLFLUSH) instruction on at least one of the one or more shared memory pages may further include: determining, by the control circuitry, whether any of the one or more executable code pages include instructions capable of changing a protection key associated with a shared page; and causing, by the control circuitry, the memory allocation related system call request to abort responsive to a determination that one or more executable code pages include instructions capable of changing a protection key associated with a shared page.

Example 15 may include elements of any of examples 11 through 14 where selectively rendering unsuccessful the cache line flush (CLFLUSH) instruction on at least one of the one or more shared memory pages may further include: determining, by the control circuitry, whether the memory allocation related system call request maps a page from a storage device to memory; causing, by the control circuitry, the memory allocation related system call request to proceed responsive to a determination that the memory allocation related system call request maps a page from a storage device to memory.

Example 16 may include elements of any of examples 11 through 15 where selectively rendering unsuccessful the cache line flush (CLFLUSH) instruction on at least one of the one or more shared memory pages may further include: determining, by the control circuitry, whether the memory allocation related system call request includes only a memory page allocation request; causing, by the control circuitry, the memory allocation related system call request to abort responsive to a determination that the memory allocation related system call request includes only a memory page allocation request.

Example 17 may include elements of any of examples 11 through 16 where selectively rendering unsuccessful the cache line flush (CLFLUSH) instruction on at least one of the one or more shared memory pages may further include: causing, by the control circuitry, the memory allocation related system call request to proceed responsive to a determination that one or more executable code pages does not include instructions capable of changing a protection key associated with a shared page.

Example 18 may include elements of any of examples 11 through 17 where selectively rendering unsuccessful the cache line flush (CLFLUSH) instruction on at least one of the one or more shared memory pages may further include: causing, by the control circuitry, the memory allocation related system call request to proceed responsive to a determination that the received memory allocation related system call request does not include one or more executable code pages.

Example 19 may include elements of any of examples 11 through 18 where selectively rendering unsuccessful the cache line flush (CLFLUSH) instruction on at least one of the one or more shared memory pages may further include: causing, by the control circuitry, the memory allocation related system call request to proceed responsive to a determination that the received memory allocation related system call request does not include one or more writable executable code pages.

Example 20 may include elements of any of examples 11 through 19 where determining whether any of the one or more executable code pages include instructions capable of changing a protection key associated with a shared page may further include: determining, by the control circuitry, whether any of the one or more executable code pages include a WRPKRU instruction capable of changing the protection key associated with the shared page.

According to example 21, there is provided a non-transitory machine-readable storage medium that includes instructions. The instructions, when executed by the control circuitry, may cause the control circuitry to: selectively render unsuccessful a cache line flush (CLFLUSH) instruction on one or more shared memory pages.

Example 22 may include elements of example 21 where the instructions may further cause all or a portion of the control circuitry to: detect, via virtual machine manager circuitry, duplicate memory pages associated with two or more virtual machines; provide, via the virtual machine manager circuitry, a single shared memory page shared by the two or more virtual machines, the single shared memory page including the content of the detected duplicate memory pages; and associate an executable only identifier with the single shared memory page to selectively disable the READ permission of the single shared memory page.

Example 23 may include elements of any of examples 21 or 22 where the instructions that cause the control circuitry to selectively render unsuccessful the cache line flush (CLFLUSH) instruction based on code included in the shared memory page may further cause the control circuitry to: determine whether a memory allocation related system call request received from user space includes one or more executable code pages; responsive to a determination that the received memory allocation related system call request includes one or more executable code pages, determine whether any of the one or more executable code pages are writable; and responsive to a determination that the received memory allocation related system call request includes one or more writable executable code pages, cause the memory allocation related system call request to abort.

Example 24 may include elements of any of examples 21 through 23 where the instructions that cause the control circuitry to selectively render unsuccessful the cache line flush (CLFLUSH) instruction based on code included in the shared memory page may further cause the control circuitry to: determine whether any of the one or more executable code pages include instructions capable of changing a protection key associated with a shared page; and responsive to a determination that one or more executable code pages include instructions capable of changing a protection key associated with a shared page, cause the memory allocation related system call request to abort.

Example 25 may include elements of any of examples 21 through 24 where the instructions that cause the control circuitry to selectively render unsuccessful the cache line flush (CLFLUSH) instruction based on code included in the shared memory page may further cause the control circuitry to: determine whether the memory allocation related system call request maps a page from a storage device to memory; and responsive to a determination that the memory allocation related system call request maps a page from a storage device to memory, cause the memory allocation related system call request to proceed.

Example 26 may include elements of any of examples 21 through 25 where the instructions that cause the control circuitry to selectively render unsuccessful the cache line flush (CLFLUSH) instruction based on code included in the shared memory page may further cause the control circuitry to: determine whether the memory allocation related system call request includes only a memory page allocation request; and responsive to a determination that the memory allocation related system call request includes only a memory page allocation request, cause the memory allocation related system call request to abort.

Example 27 may include elements of any of examples 21 through 26 where the instructions that cause the control circuitry to selectively render unsuccessful the cache line flush (CLFLUSH) instruction based on code included in the shared memory page may further cause the control circuitry to: responsive to a determination that one or more executable code pages does not include instructions capable of changing a protection key associated with a shared page, cause the memory allocation related system call request to proceed.

Example 28 may include elements of any of examples 21 through 27 where the instructions that cause the control circuitry to selectively render unsuccessful the cache line flush (CLFLUSH) instruction based on code included in the shared memory page present in the system memory may further cause the control circuitry to: responsive to a determination that the received memory allocation related system call request does not include one or more executable code pages, cause the memory allocation related system call request to proceed.

Example 29 may include elements of any of examples 21 through 28 where the instructions that cause the control circuitry to selectively render unsuccessful a cache line flush (CLFLUSH) instruction based on code included in the shared memory page may further cause the control circuitry to: responsive to a determination that the received memory allocation related system call request does not include one or more writable executable code pages, cause the memory allocation related system call request to proceed.

Example 30 may include elements of any of examples 21 through 29 where the instructions that cause the control circuitry to determine whether any of the one or more executable code pages include instructions capable of changing the protection key associated with the shared page may further cause the control circuitry to: determine whether any of the one or more executable code pages include a WRPKRU instruction capable of changing the protection key associated with the shared page.

According to example 31, there is provided a side-channel attack protection system. The system may include: means for determining whether a memory page access request attempts to access one or more shared memory pages; and means for responsive to a determination that the memory page access request accesses a shared memory page, selectively rendering unsuccessful a cache line flush (CLFLUSH) instruction on at least one of the one or more shared memory pages.

Example 32 may include elements of example 31, and the system may further include: means for detecting duplicate memory pages associated with the two or more virtual machines; wherein the means for determining whether a memory page access request attempts to access one or more shared memory pages comprises: means for determining whether a memory page access request attempts to access one or more shared memory pages associated with two or more virtual machines; means for providing a single shared memory page shared by the two or more virtual machines, the single shared memory page including the content of the detected duplicate memory pages; and means for associating an executable only identifier with the single shared memory page to selectively disable the READ permission of the single shared memory page.

Example 33 may include elements of any of examples 31 or 32 where the means for selectively rendering unsuccessful the cache line flush (CLFLUSH) instruction on at least one of the one or more shared memory pages may further include: means for determining whether a memory allocation related system call request received from user space includes one or more executable code pages; means for determining whether any of the one or more executable code pages are writable responsive to a determination that the received memory allocation related system call request includes one or more executable code pages; and means for causing the memory allocation related system call request to abort responsive to a determination that the received memory allocation related system call request includes one or more writable executable code pages.

Example 34 may include elements of any of examples 31 through 33 where the means for selectively rendering unsuccessful the cache line flush (CLFLUSH) instruction on at least one of the one or more shared memory pages may further include: means for determining whether any of the one or more executable code pages include instructions capable of changing a protection key associated with a shared page; and means for causing the memory allocation related system call request to abort responsive to a determination that one or more executable code pages include instructions capable of changing a protection key associated with a shared page.

Example 35 may include elements of any of examples 31 through 34 where the means for selectively rendering unsuccessful the cache line flush (CLFLUSH) instruction on at least one of the one or more shared memory pages may further include: means for determining whether the memory allocation related system call request maps a page from a storage device to memory; and means for causing the memory allocation related system call request to proceed responsive to a determination that the memory allocation related system call request maps a page from a storage device to memory.

Example 36 may include elements of any of examples 31 through 35 where the means for selectively rendering unsuccessful the cache line flush (CLFLUSH) instruction on at least one of the one or more shared memory pages may further include: means for determining whether the memory allocation related system call request includes only a memory page allocation request; and means for causing the memory allocation related system call request to abort responsive to a determination that the memory allocation related system call request includes only a memory page allocation request.

Example 37 may include elements of any of examples 31 through 36 where the means for selectively rendering unsuccessful the cache line flush (CLFLUSH) instruction on at least one of the one or more shared memory pages may further include: means for causing the memory allocation related system call request to proceed responsive to a determination that one or more executable code pages does not include instructions capable of changing a protection key associated with a shared page.

Example 38 may include elements of any of examples 31 through 37 where the means for selectively rendering unsuccessful the cache line flush (CLFLUSH) instruction on at least one of the one or more shared memory pages may further include: means for causing, by the control circuitry, the memory allocation related system call request to proceed responsive to a determination that the received memory allocation related system call request does not include one or more executable code pages.

Example 39 may include elements of any of examples 31 through 38 where the means for selectively rendering unsuccessful the cache line flush (CLFLUSH) instruction on at least one of the one or more shared memory pages may further include: means for causing the memory allocation related system call request to proceed responsive to a determination that the received memory allocation related system call request does not include one or more writable executable code pages.

Example 40 may include elements of any of examples 31 through 39 where the means for determining whether any of the one or more executable code pages include instructions capable of changing a protection key associated with a shared page may further include: means for determining whether any of the one or more executable code pages include a WRPKRU instruction capable of changing the protection key associated with the shared page.

According to example 41, there is provided a system for selectively mitigating side-channel attacks using executable only memory (XOM), the system being arranged to perform the method of any of examples 11 through 20.

According to example 42, there is provided a chipset arranged to perform the method of any of examples 11 through 20.

According to example 42, there is provided at least one non-transitory machine readable medium comprising a plurality of instructions that, in response to be being executed on a processor-based device, cause the computing device to carry out the method according to any of examples 11 through 20.

According to example 43, there is provided a device configured for selectively mitigating side-channel attacks using executable only memory (XOM), the device being arranged to perform the method of any of the examples 11 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A side-channel attack protection system, comprising: control circuitry; memory circuitry coupled to the control circuitry; a storage device that includes instructions, when executed by the control circuitry, cause the control circuitry to selectively render unsuccessful a cache line flush (CLFLUSH) instruction on one or more shared code pages by performing operations comprising:
   determining whether a code page associated with a memory allocation related system call request includes executable code;
   responsive to a determination that the code page associated with the memory allocation related system call includes executable code, determining whether the code page is writable;
   responsive to a determination that the code page includes executable code and is writeable, causing the memory allocation related system call request to abort;
   responsive to a determination that the code page includes executable code and is not writeable, determining whether the code page includes a Write Protection Key Rights User (WRPKRU) instruction capable of changing a memory protection flag stored in a page table and associated with a shared code page; and
   responsive to a determination that the code page includes a WRPKRU instruction capable of changing a memory protection flag associated with a shared code page, causing the memory allocation related system call request to abort.

2. The side-channel attack protection system of claim 1: wherein the memory circuitry includes memory pages associated with two or more virtual machines; wherein the instructions cause all or a portion of the control circuitry to provide virtual machine manager (VMM) circuitry to: detect duplicate memory pages associated with the two or more virtual machines; provide a single shared memory page shared by the two or more virtual machines, the single shared memory page including content of the detected duplicate memory pages; and associate an executable only identifier with the single shared memory page to selectively disable a READ permission of the single shared memory page.

3. The side channel-attack protection system of claim 1 wherein the instructions that cause the control circuitry to selectively render unsuccessful the cache line flush (CLFLUSH) instruction based on code included in the shared memory page further cause the control circuitry to perform operations comprising: determining whether the memory allocation related system call request maps a page from a storage device to memory; responsive to a determination that the memory allocation related system call request maps a page from a storage device to memory, causing the memory allocation related system call request to proceed.

4. The side channel-attack protection system of claim 3 wherein the instructions that cause the control circuitry to selectively render unsuccessful the cache line flush (CLFLUSH) instruction based on code included in the shared memory page further cause the control circuitry to perform operations comprising: determining whether the memory allocation related system call request includes only a memory page allocation request; responsive to a determination that the memory allocation related system call request includes only a memory page allocation request, causing the memory allocation related system call request to abort.

5. The side channel-attack protection system of claim 1 wherein the instructions that cause the control circuitry to selectively render unsuccessful the cache line flush (CLFLUSH) instruction based on code included in the shared memory page further cause the control circuitry to perform operations comprising: responsive to a determination that one or more code pages do not include instructions capable of changing a memory protection flag associated with a shared page, causing the memory allocation related system call request to proceed.

6. The side channel-attack protection system of claim 1 wherein the instructions that cause the control circuitry to selectively render unsuccessful the cache line flush (CLFLUSH) instruction based on code included in the shared memory page present in the system memory further cause the control circuitry to perform operations comprising: responsive to a determination that the one or more code pages associated with the received memory allocation related system call request do not include executable code, causing the memory allocation related system call request to proceed.

7. The side channel-attack protection system of claim 1 wherein the instructions that cause the control circuitry to selectively render unsuccessful the cache line flush (CLFLUSH) instruction based on code included in the shared memory page further cause the control circuitry to perform operations comprising: responsive to a determination that the one or more code pages associated with the received memory allocation related system call request do not include executable code, causing the memory allocation related system call request to proceed.

8. The side channel-attack protection system of claim 1 wherein the instructions that cause the control circuitry to determine whether the code page is writeable and determine whether the code page includes executable code based on a particular memory protection flag stored in a page table and associated with the code page.

9. A side-channel attack protection method, comprising:
  determining, by control circuitry, whether a memory page access request attempts to access one or more shared memory pages; and responsive to a determination that the memory page access request accesses a shared memory page, selectively rendering unsuccessful a cache line flush (CLFLUSH) instruction on at least one of the one or more shared memory pages by:
  determining that a code page associated with a memory allocation related system call request includes executable code;
  responsive to a determination that the code page associated with the memory allocation related system call includes executable code, determining whether the code page is writable;
  responsive to a determination that the code page includes executable code and is writeable, causing the memory allocation related system call request to abort;
  responsive to a determination that the code page includes executable code and is not writeable, determining whether the code page includes a Write Protection Key Rights User (WRPKRU) instruction capable of changing a memory protection flag stored in a page table and associated with a shared code page; and
  responsive to a determination that the code page includes a WRPKRU instruction capable of changing a memory protection flag associated with a shared code page, causing the memory allocation related system call request to abort.

10. The side-channel attack protection method of claim 9, further comprising: detecting, by virtual machine manager (VMM) circuitry, duplicate memory pages associated with the two or more virtual machines; wherein determining, by control circuitry, whether a memory page access request attempts to access one or more shared memory pages comprises: determining, by control circuitry, whether a memory page access request attempts to access one or more shared memory pages associated with two or more virtual machines; providing, by the VMM circuitry, a single shared memory page shared by the two or more virtual machines, the single shared memory page including content of the detected duplicate memory pages; and associating, by the VMM circuitry, an executable only identifier with the single shared memory page to selectively disable a READ permission of the single shared memory page.

11. The side channel-attack protection method of claim 9 wherein selectively rendering unsuccessful the cache line flush (CLFLUSH) instruction on at least one of the one or more shared memory pages further comprises: determining, by the control circuitry, whether the memory allocation related system call request maps a page from a storage device to memory; causing, by the control circuitry, the memory allocation related system call request to proceed responsive to a determination that the memory allocation related system call request maps a page from a storage device to memory.

12. The side channel-attack protection method of claim 11 wherein selectively rendering unsuccessful the cache line flush (CLFLUSH) instruction on at least one of the one or more shared memory pages further comprises: determining, by the control circuitry, whether the memory allocation related system call request includes only a memory page allocation request; causing, by the control circuitry, the memory allocation related system call request to abort responsive to a determination that the memory allocation related system call request includes only a memory page allocation request.

13. The side channel-attack protection method of claim 9 wherein selectively rendering unsuccessful the cache line flush (CLFLUSH) instruction on at least one of the one or more shared memory pages further comprises: causing, by the control circuitry, the memory allocation related system call request to proceed responsive to a determination that one or more code pages do not include instructions capable of changing a memory protection flag associated with a shared code page.

14. The side channel-attack protection method of claim 9 wherein selectively rendering unsuccessful the cache line flush (CLFLUSH) instruction on at least one of the one or more shared memory pages further comprises: causing, by the control circuitry, the memory allocation related system call request to proceed responsive to a determination that the one or more code pages associated with the received memory allocation related system call request do not include executable code.

15. The side channel-attack protection method of claim 9 wherein selectively rendering unsuccessful the cache line flush (CLFLUSH) instruction on at least one of the one or more shared memory pages further comprises: causing, by the control circuitry, the memory allocation related system call request to proceed responsive to a determination that the one or more code pages associated with the received memory allocation related system call request do not include one or more writable code pages.

16. A non-transitory machine-readable storage medium that includes instructions, when executed by a control circuitry, cause the control circuitry to: selectively render unsuccessful a cache line flush (CLFLUSH) instruction on one or more shared memory pages by performing operations comprising:
determining whether a code page associated with a memory allocation related system call request includes executable code;
responsive to a determination that the code page associated with the memory allocation related system call includes executable code, determining whether the code page is writable; and responsive to a determination that the code page includes executable code and is writeable, causing the memory allocation related system call request to abort;
responsive to a determination that the code page includes executable code and is not writeable, determining whether the code page includes a Write Protection Key Rights User (WRPKRU) instruction capable of changing a memory protection flag stored in a page table and associated with a shared code page; and
responsive to a determination that the code page includes a WRPKRU instruction capable of changing a memory protection flag associated with a shared code page, causing the memory allocation related system call request to abort.

17. The non-transitory machine-readable storage medium of claim 16 wherein the instructions further cause all or a portion of the control circuitry to: detect, via virtual machine manager circuitry, duplicate memory pages associated with two or more virtual machines; provide, via the virtual machine manager circuitry, a single shared memory page shared by the two or more virtual machines, the single shared memory page including content of the detected duplicate memory pages; and associate an executable only identifier with the single shared memory page to selectively disable a READ permission of the single shared memory page.

18. A side-channel attack protection system, comprising:
means for determining whether a memory page access request attempts to access one or more shared memory pages; and means for selectively rendering unsuccessful a cache line flush (CLFLUSH) instruction on at least one of the one or more shared memory pages responsive to a determination that the memory page access request accesses a shared memory page by performing operations comprising:
determining whether one or more code pages associated with a memory allocation related system call request includes executable code;
responsive to a determination that a code page associated with the memory allocation related system call includes executable code, determining whether the code page is writable; responsive to a determination that the code page includes executable code and is writeable, causing the memory allocation related system call request to abort;
responsive to a determination that the code page includes executable code and is not writeable, determining whether the code page includes a Write Protection Key Rights User (WRPKRU) instruction capable of changing a memory protection flag stored in a page table and associated with a shared code page; and
responsive to a determination that the code page includes a WRPKRU instruction capable of changing a memory protection flag associated with a shared code page, causing the memory allocation related system call request to abort.

* * * * *